US008184785B2

(12) United States Patent
Kuroda

(10) Patent No.: US 8,184,785 B2
(45) **Date of Patent: *May 22, 2012**

(54) ELEVATOR MONITOR SYSTEM

(75) Inventor: Shinichi Kuroda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1548 days.

This patent is subject to a terminal disclaimer.

(21) Appl. No.: 11/597,271

(22) PCT Filed: Apr. 28, 2005

(86) PCT No.: PCT/JP2005/008158

§ 371 (c)(1),
(2), (4) Date: Nov. 20, 2006

(87) PCT Pub. No.: WO2006/117861

PCT Pub. Date: Nov. 9, 2006

(65) Prior Publication Data

US 2007/0230670 A1 Oct. 4, 2007

(51) Int. Cl.
*H04M 11/00* (2006.01)

(52) U.S. Cl. ................................... 379/106.01; 167/391

(58) Field of Classification Search ............. 379/106.01, 379/90.01–93.01; 187/391, 247, 392
See application file for complete search history.

(56) References Cited

U.S. PATENT DOCUMENTS

| | | | | |
|---|---|---|---|---|
| 5,386,463 | A * | 1/1995 | Thompson | 379/182 |
| 5,736,694 | A * | 4/1998 | Ketoviita | 187/391 |
| 6,336,523 | B1 * | 1/2002 | Ozeki et al. | 187/391 |
| 7,344,004 | B2 * | 3/2008 | Engel et al. | 187/391 |
| 7,419,032 | B2 * | 9/2008 | Yamakawa | 187/247 |
| 7,428,002 | B2 * | 9/2008 | Monroe | 348/143 |
| 7,552,801 | B2 * | 6/2009 | Trifu | 187/391 |
| 7,823,702 | B2 * | 11/2010 | Hirade | 187/392 |
| 2004/0022377 | A1 * | 2/2004 | Elberbaum | 379/106.01 |
| 2004/0240627 | A1 * | 12/2004 | Nakajima | 379/37 |
| 2008/0123826 | A1 * | 5/2008 | Hirade | 379/106.01 |

FOREIGN PATENT DOCUMENTS

| | | |
|---|---|---|
| JP | 4 277181 | 10/1992 |
| JP | 7 257842 | 10/1995 |
| JP | 2888346 | 2/1999 |
| JP | 2004 15110 | 1/2004 |
| JP | 2004 189358 | 7/2004 |
| JP | 2004 252763 | 9/2004 |

* cited by examiner

*Primary Examiner* — Curtis Kuntz
*Assistant Examiner* — Maria El-Zoobi
(74) *Attorney, Agent, or Firm* — Oblon, Spivak, McClelland, Maier & Neustadt, L.L.P.

(57) ABSTRACT

In an elevator monitoring system, an operation monitoring device receives operating condition data from a group management control device, and causes a monitor to display operating conditions of a plurality of elevators. An interphone base unit is connected to the operation monitoring device such that mutual communication can be established therebetween. The operation monitoring device can cause the monitor to display communication states of interphone handset units based on information on the communication states of the interphone handset units which has been received from the interphone base unit, and can input thereto channel select information for selecting one of the interphone handset units to communicate with. The interphone base unit can transmit the communication state information to the operation monitoring device, and can make a changeover in the states of connection with the interphone handset units based on the channel select information received from the operation monitoring device.

8 Claims, 21 Drawing Sheets

FIG. 2

| COMMUNICATION STATE (CHANNEL SELECT STATE) | COMMUNICATION SYMBOL |
|---|---|
| TALKING | 1 |
| CALLING | 2 |
| WAITING | 3 |

FIG. 11

| CAMERA ID | MACHINE CODE NAME |
|---|---|
| 1 | ELEVATOR MACHINE A |
| 2 | ELEVATOR MACHINE B |
| 3 | ELEVATOR MACHINE C |

ELEVATOR MONITOR SYSTEM

TECHNICAL FIELD

The present invention relates to an elevator monitoring system for monitoring operating conditions of an elevator by monitoring the operating conditions displayed on a monitor.

BACKGROUND ART

A conventional elevator monitoring device receives operating condition data from a group management control device for controlling operations of cars of a plurality of elevators, and displays operating conditions of the cars on a monitor (e.g., see Patent Document 1).

Patent Document 1: JP 2004-189358 A

DISCLOSURE OF THE INVENTION

Problem to be Solved by the Invention

In the conventional elevator monitoring device constructed as described above, when a passenger in a car in forms a management room of an occurrence of, for example, an emergency situation in the car through an interphone, a manager in the management room confirms contents of an abnormality on the elevator monitoring device and then moves to a position in front of an interphone base unit to talk with the passenger through operation of a channel select button. Therefore, a long time and much labor are required until the manager becomes ready to talk with the passenger.

The present invention has been made to solve the problem as described above, and it is therefore an object of the invention to obtain an elevator monitoring system with which talking with a passenger in a car through an interphone is started more swiftly.

Means for Solving the Problems

An elevator monitoring system according to the present invention, includes: an interphone base unit capable of communicating with a plurality of interphone handset units; and an operation monitoring device that receives operating condition data from a group management control device for controlling operations of a plurality of elevators, and causes a monitor to display operating conditions of the elevators, in which: the interphone base unit and the operation monitoring device can communicate with each other; the operation monitoring device can cause the monitor to display communication states of the interphone handset units based on information on the communication states of the interphone handset units which has been received from the interphone base unit, and channel select information for selecting one of the interphone handset units to communicate with can be input; and the interphone base unit can transmit the information on the communication states to the operation monitoring device, and can make a changeover between states of connection with the interphone handset units based on the channel select information received from the operation monitoring device.

BRIEF DESCRIPTION OF THE DRAWINGS

FIG. 2 An explanatory diagram showing a conversion table of information on communication states of interphone handset units of FIG. 1.

FIG. 11 An explanatory diagram showing a correspondence table indicating how monitoring cameras set in a display control means of FIG. 9 correspond to machine code names respectively.

BEST MODES FOR CARRYING OUT THE INVENTION

Preferred embodiments of the present invention will be described hereinafter with reference to the drawings.

Embodiment 1

Figure 1:
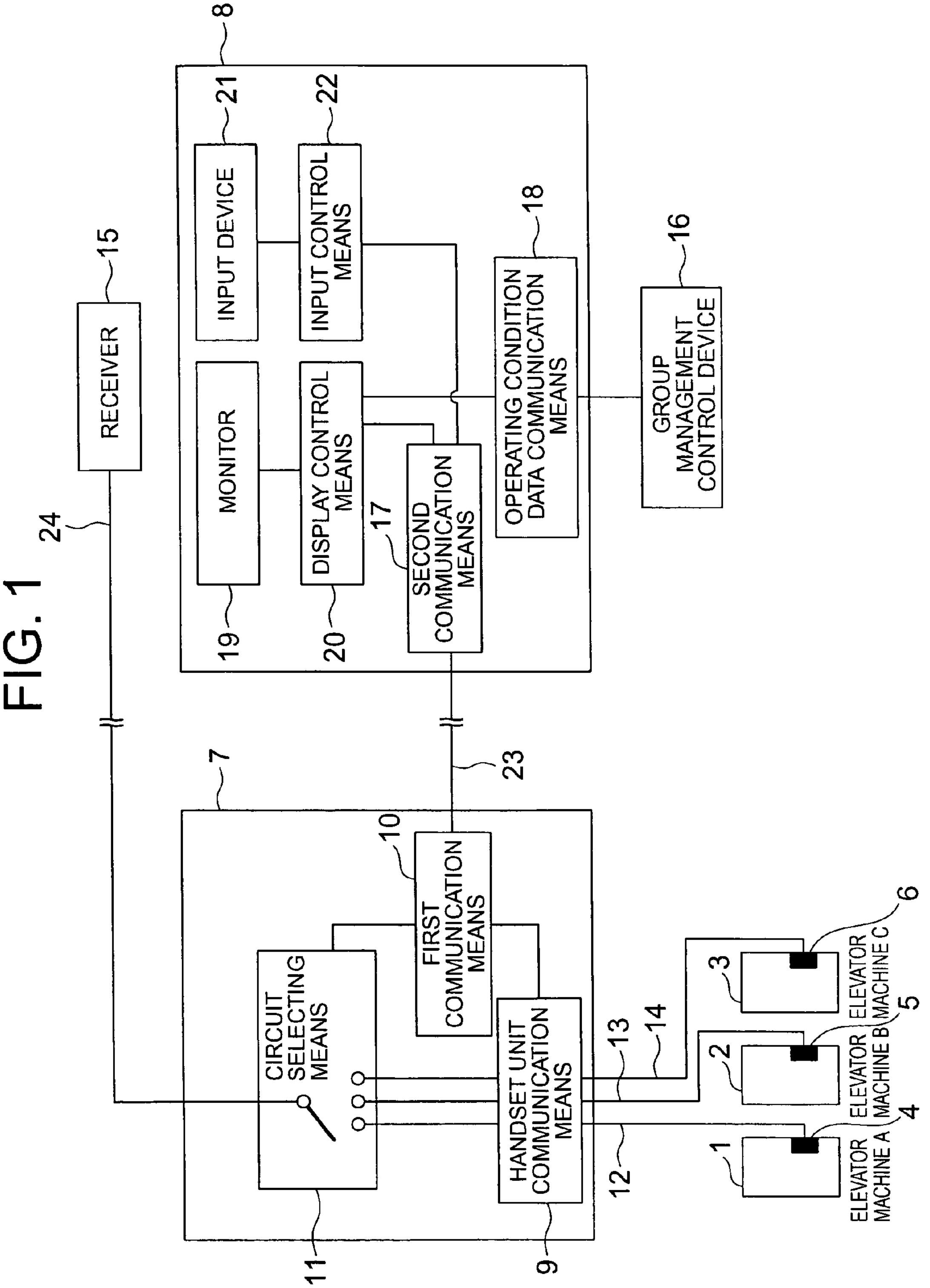
FIG. 1 A block diagram showing an elevator monitoring system according to Embodiment 1 of the present invention.

FIG. 1 is a block diagram showing an elevator monitoring system according to Embodiment 1 of the present invention. In this example, a monitoring system for monitoring three elevators, namely, elevator machines A to C is illustrated. Interphone handset units 4 to 6 for allowing passengers in cars 1 to 3 of the elevators to talk with a manager in a management room are provided in the cars 1 to 3, respectively. The interphone handset units 4 to 6 are provided with receivers (not shown), respectively.

The management room is, for example, a disaster control center in a building. An interphone base unit 7 and an operation monitoring device 8 for monitoring the operating conditions of the elevators are installed in the management room.

The interphone base unit 7 has a handset unit communication means 9 for communicating with the interphone handset units 4 to 6, a first communication means 10 for communicating with the operation monitoring device 8, and a circuit selecting means 11 for selecting a communication partner from the interphone handset units 4 to 6.

The handset unit communication means 9 is connected to the interphone handset units 4 to 6 via audio cables 12 to 14, respectively. The handset unit communication means 9 inputs information on the communication states of the interphone handset units 4 to 6 to the first communication means 10. The first communication means 10 transmits the information on the communication states of the interphone handset units 4 to 6 to the operation monitoring device 8. The first communication means 10 receives channel select information for selecting a communication partner from the operation monitoring device 8, and inputs it to the circuit selecting means 11. A receiver 15 is connected to the handset communication means 9 via the circuit selecting means 11 and an audio cable 24. The receiver 15 is disposed at such a position that the manager is allowed to talk while operating/monitoring the operation monitoring device 8.

The operation monitoring device 8 is connected to a group management control device 16 for controlling the operations of the cars 1 to 3. The group management control device 16 is installed in, for example, a machinery room of a building. The operation monitoring device 8 receives data on the operating conditions of the cars 1 to 3 from the group management control device 16. Included in the data on the operating conditions are, for example, information on floors (information on car positions), information on open/closed states of doors, information on running directions of the cars 1 to 3, information on machine code names, and the like.

The operation monitoring device 8 has a second communication means 17 for communicating with the first communication means 10, an operating condition data communication means 18 for communicating with the group management control device 16, a monitor 19 for displaying the operating conditions of the cars 1 to 3, a display control means 20 for controlling the monitor 19, an input device 21 for input of an operation performed by the manager, and an input control means 22 which operates in accordance with an operation of the input device 21.

The first communication means 10 and the second communication means 17 are connected to each other via a communication cable 23. Employed as the communication cable 23 is a cable satisfying Ethernet® standard (the standard concerning a LAN (Local Area Network) standardized by "IEEE802.3 committee").

The operation monitoring device 8 has a computer (not shown) having a calculation processing portion (CPU), a storage portion (ROM, RAM, hard disk, and the like), and signal input/output portions. Functions of the display control means 20 and the input control means 22 are realized by the computer of the operation monitoring device 8. In other words, programs for realizing the functions of the display control means 20 and the input control means 22 are stored in the storage portion of the computer. The calculation processing portion performs calculation processings regarding the functions of the display control means 20 and the input control means 22 based on the programs. A mouse and a keyboard that are connected to the computer can be employed as the input device 21.

The second communication means 17 receives information on the communication states of the interphone handset units 4 to 6 from the first communication means 10, and inputs it to the display control means 20. That is, the second communication means 17 writes the communication state information into a first buffer (not shown) of the display control means 20. Then, the display control means 20 causes the monitor 19 to display the communication states of the interphone handset units 4 to 6 based on the communication state information.

The data on the operating conditions, which have been received by the operating condition data communication means 18, are input to the display control means 20. In other words, the operating condition data communication means 18 writes the data on the operating conditions into a second buffer (not shown) of the display control means 20. Then, the display control means 20 causes the monitor 19 to display the operating conditions of the cars 1 to 3 based on the data on the operating conditions. Employable as the monitor 19 is, for example, a liquid crystal display, a CRT display, a plasma display, or the like.

The input control means 22 inputs channel select information for selecting a communication partner of the interphone base unit 7 to the second communication means 17 in accordance with the operation on the input device 21. The channel select information is transmitted from the second communication means 17 to the first communication means 10.

FIG. 2 is an explanatory diagram showing a conversion table of information on the communication states of the interphone handset units 4 to 6 of FIG. 1. The handset unit communication means 9 periodically monitors the communication states of the audio cables 12 to 14, and converts them into communication symbols based on the conversion table of FIG. 2. Referring to FIG. 2, "TALKING" represents a state in which the interphone handset unit 4, 5, or 6 is in communication with the interphone base unit 7. "CALLING" represents a state of requesting communication with the interphone base unit 7 from the interphone handset unit 4, 5, or 6. "WAITING" represents a state which is neither "TALKING" nor "CALLING".

For instance, while the interphone handset unit 4 is calling and the interphone handset units 5 and 6 are waiting, the communication state information is expressed as "233", which is obtained by arranging the communication symbols corresponding to the communication states in an order of the elevator machine A, the elevator machine B, and the elevator machine C. The common conversion table as shown in FIG. 2 is preset in the handset unit communication means 9, the circuit selecting means 11, the display control means 20, and the input control means 22.

Figure 3:
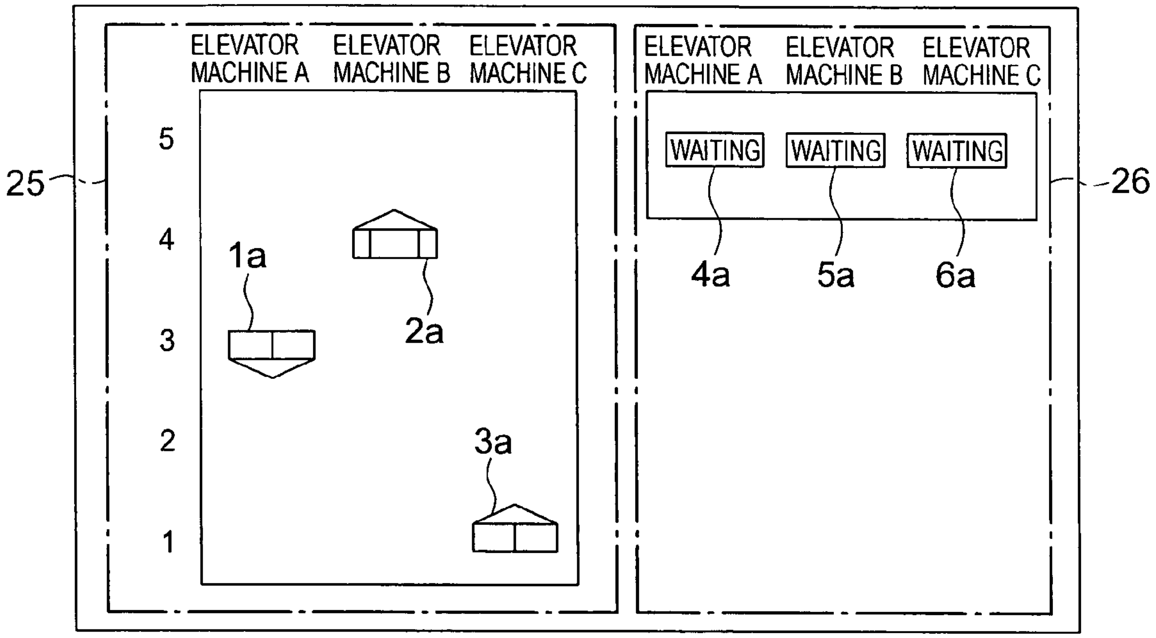
FIG. 3 A front view showing an example of contents displayed on a monitor of FIG. 1.

FIG. 3 is a front view showing an example of the contents displayed on the monitor 19 of FIG. 1. A screen of the monitor 19 includes an operating condition display region 25 based on the data on the operating conditions transmitted from the group management control device 16, and a channel select button display region 26 based on the communication state information transmitted from the handset unit communication means 9. Machine code names (elevator machines A to C), floor names (first to fifth floors), and car indicating marks 1*a* to 3*a* corresponding to the cars 1 to 3, respectively, are displayed in the operating condition display region 25.

The car indicating marks 1*a* to 3*a* are moved in accordance with raising/lowering of the corresponding cars 1 to 3, respectively. It is apparent from FIG. 3 that the car 1 is located on the third floor, that the car 2 is located on the fourth floor, and that the car 3 is located on the first floor. An upper portion or a lower portion of each of the car indicating marks 1*a* to 3*a* is accompanied with a triangle (a direction indicating portion) indicating a direction in which a corresponding one of the cars 1 to 3 is running. It is apparent from FIG. 3 that the car 1 is running downward, and that the cars 2 and 3 are running upward. In addition, the car indicating marks 1*a* to 3*a* indicate open/closed states of the doors of the corresponding cars 1 to 3, respectively. It is apparent from FIG. 3 that the doors of the cars 1 and 3 are closed, and that the door of the car 2 is open.

A plurality of channel select buttons 4a to 6a corresponding to the interphone handset units 4 to 6 and the machine code names corresponding to the channel select buttons 4a to 6a are displayed in the channel select button display region 26. The communication states of the corresponding interphone handset units 4 to 6 are displayed on the channel select buttons 4a to 6a, respectively, in accordance with the communication state information transmitted from the handset unit communication means 9. To be more specific, on the basis of the conversion table of FIG. 2, each of the communication states is indicated as "TALKING", "CALLING", and "WAITING" when a corresponding one of the communication symbols is 1, 2, and 3, respectively. In FIG. 3, since the communication state information is "333", the communication states are indicated as "WAITING" in all the channel select buttons 4a to 6a.

The manager in the management room can input channel select information for designating one of the channel select buttons 4a to 6a to the input control means 22, using the input device 21 such as the mouse and the keyboard.

Figure 4:
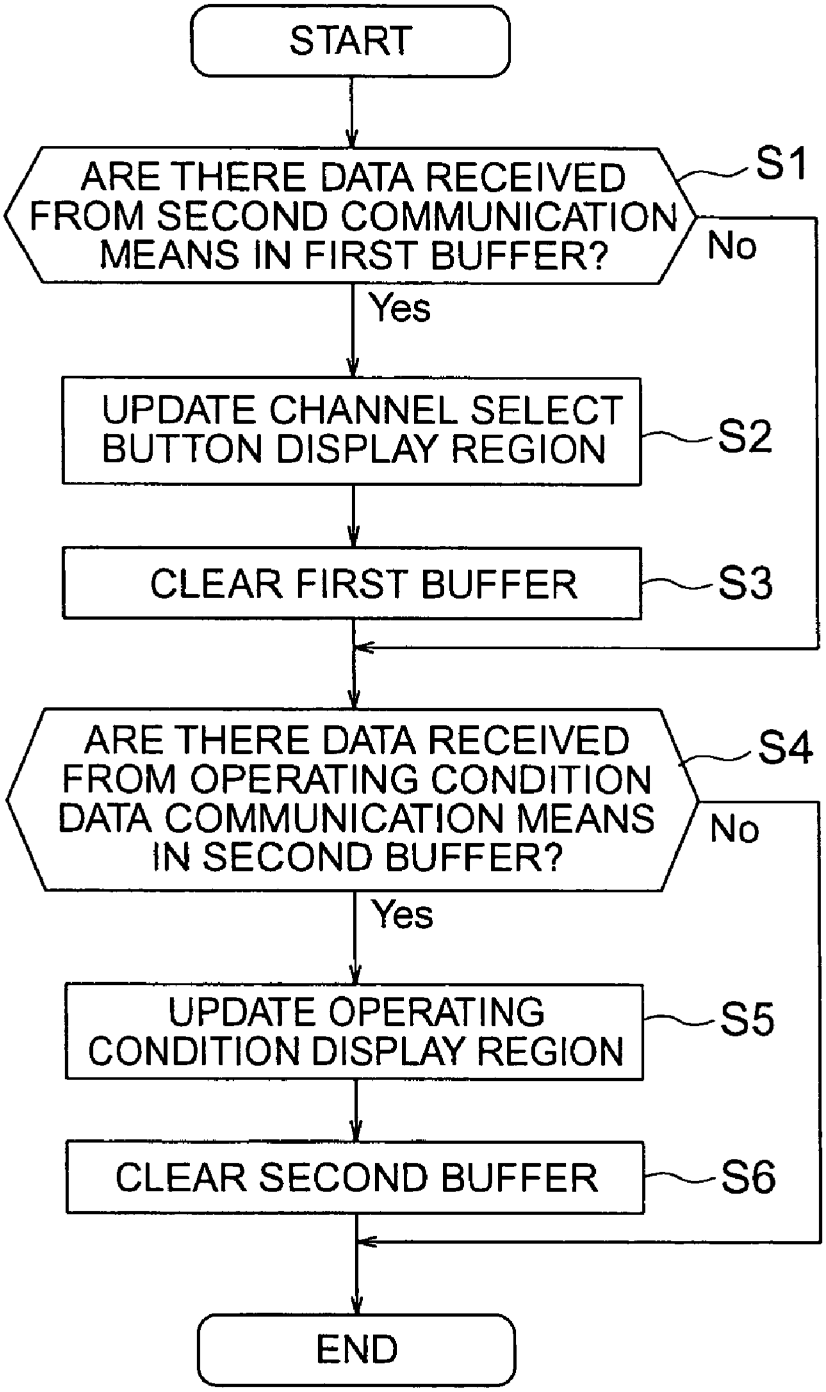
FIG. 4 A flowchart showing operations of a display control means of FIG. 1.

FIG. 4 is a flowchart showing the operations of the display control means 20 of FIG. 1. The display control means 20 periodically (e.g., at intervals of 200 milliseconds) performs a processing shown in FIG. 4 to update the contents displayed in the operating condition display region 25 and the channel select button display region 26 shown in FIG. 3.

According to the operation shown in FIG. 4, the display control means 20 first confirms whether or not there are data received from the second communication means 17 in the first buffer (Step S1). When there are no received data in the first buffer, the display control means 20 then confirms whether or not there are data received from the operating condition data communication means 18 in the second buffer (Step S4). When there are no received data in either of the buffers, the display control means 20 ends the processing.

When the data have been written into the first buffer, the display control means 20 updates the contents displayed in the channel select button display region 26 (Step S2). For example, when the communication state information "233" has been written into the first buffer, the display control means 20 recognizes that the communication symbol of the elevator machine A is "2", and that the communication symbols of the elevator machines B and C are "3", and displays the contents displayed in the channel select button display region 26 as to the elevator machines A, B, and C as "CALLING", "WAITING", and "WAITING", respectively, based on the conversion table of FIG. 2. After having updated the displayed contents, the display control means 20 initializes the first buffer (Step S3), and confirms whether or not there are received data in the second buffer (Step S4).

When data have been written into the second buffer, the display control means 20 updates the contents displayed in the operating condition display region 25 (Step S5), initializes the second buffer (Step S6), and then ends the processing.

Figure 5:
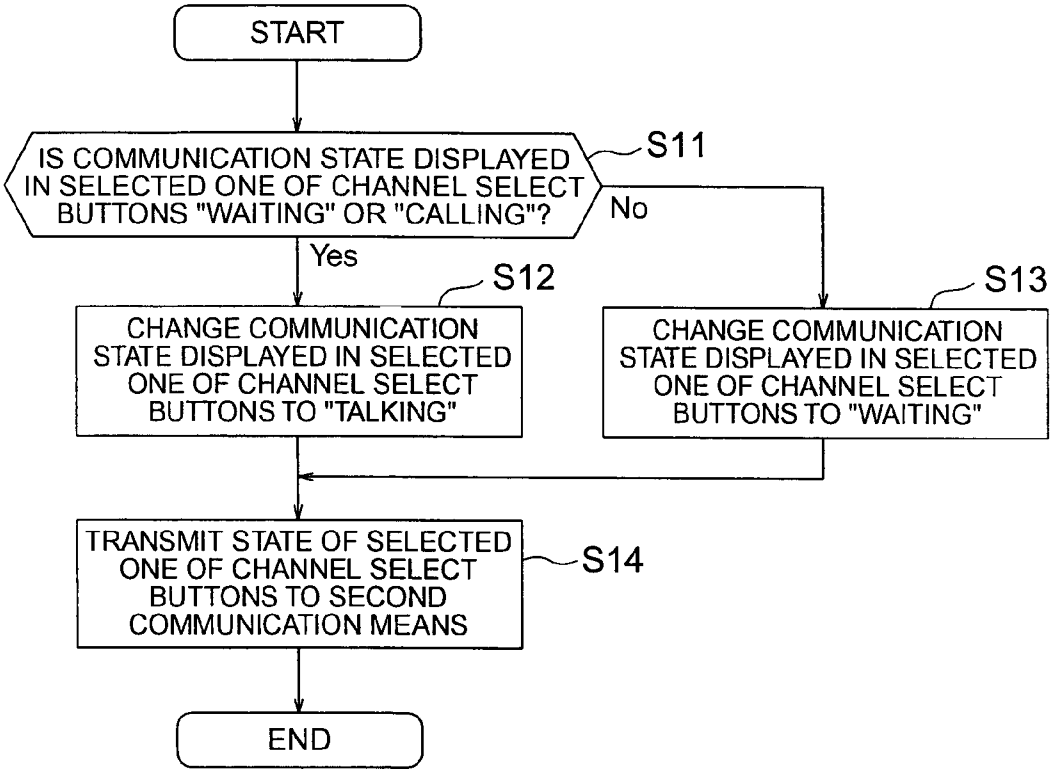
FIG. 5 A flowchart showing operations of an input control means of FIG. 1.

FIG. 5 is a flow chart showing the operations of the input control means 22 of FIG. 1. The processing shown in this flowchart is started in response to the selection of one of the channel select buttons 4a to 6a through the use of the input device 21. When one of the channel select buttons 4a to 6a is selected, the input control means 22 judges whether or not the communication state displayed in the selected one of the channel select buttons 4a to 6a is "WAITING" or "CALLING" (Step S11).

When the communication state displayed in the selected one of the channel select buttons 4a to 6a is "WAITING" or "CALLING", the input control means 22 judges that the manager wants to start talking with a passenger, and changes the communication state displayed in the selected one of the channel select buttons 4a to 6a to "TALKING" (Step S12). When the communication state displayed in the selected one of the channel select buttons 4a to 6a is "TALKING", the input control means 22 judges that the manager wants to stop talking with the passenger, and changes the communication state displayed in the selected one of the channel select buttons 4a to 6a to "WAITING" (Step S13).

After that, the input control means 22 transmits the changed contents displayed in the selected one of the change select buttons 4a to 6a to the second communication means 17 as channel select information (Step S14). The channel select information is created based on the conversion table shown in FIG. 2. For example, when the channel select states of the elevator machines A and C are "WAITING" and the channel select state of the elevator machine B is "TALKING", the channel select information is expressed as "313" using the communication symbols.

Upon receiving the channel select information from the input control means 22, the second communication means 17 immediately transmits the channel select information to the first communication means 10. The first communication means 10 inputs the received channel select information to the circuit selecting means 11. The circuit selecting means 11 connects/disconnects the receiver 15 to/from circuits of the interphone handset units 4 to 6 in accordance with the input channel select information.

For example, when the channel select information is "313", the circuit selecting means 11 determines that the communication symbol indicating "TALKING" is allocated to the elevator machine B, and connects the audio cable 13 connected to the interphone handset unit 5 of the elevator machine B to the audio cable 24 connected to the receiver 15. Thus, the passenger in the car 2 of the elevator machine B is allowed to talk with the manager in the management room.

In the elevator monitoring system according to Embodiment 1 of the present invention, as described above, the interphone base unit 7 and the operation monitoring device 8 can communicate with each other. The operation monitoring device 8 can cause the monitor 19 to display the communication states of the interphone handset units 4 to 6 as well as the operating conditions of the elevators, based on the information on the communication states of the interphone handset units 4 to 6, which has been received from the interphone base unit 7. Moreover, the operation monitoring device 8 can input channel select information for selecting one of the interphone handset units 4 to 6 to establish communication with. On the other hand, the interphone base unit 7 can transmit the communication state information to the operation monitoring device 8, and make a changeover in the states of connection with the interphone handset units 4 to 6 based on the channel select information received from the operation monitoring device 8.

Accordingly, the manager can talk with the passenger in a desired one of the cars 1 to 3 through interphone while monitoring the operating conditions of the elevators in front of the operation monitoring device 8. Thus, even when an emergency situation arises, the manager can start talking with the passenger in a corresponding one of the cars 1 to 3 through interphone more swiftly.

Embodiment 2

Figure 6:
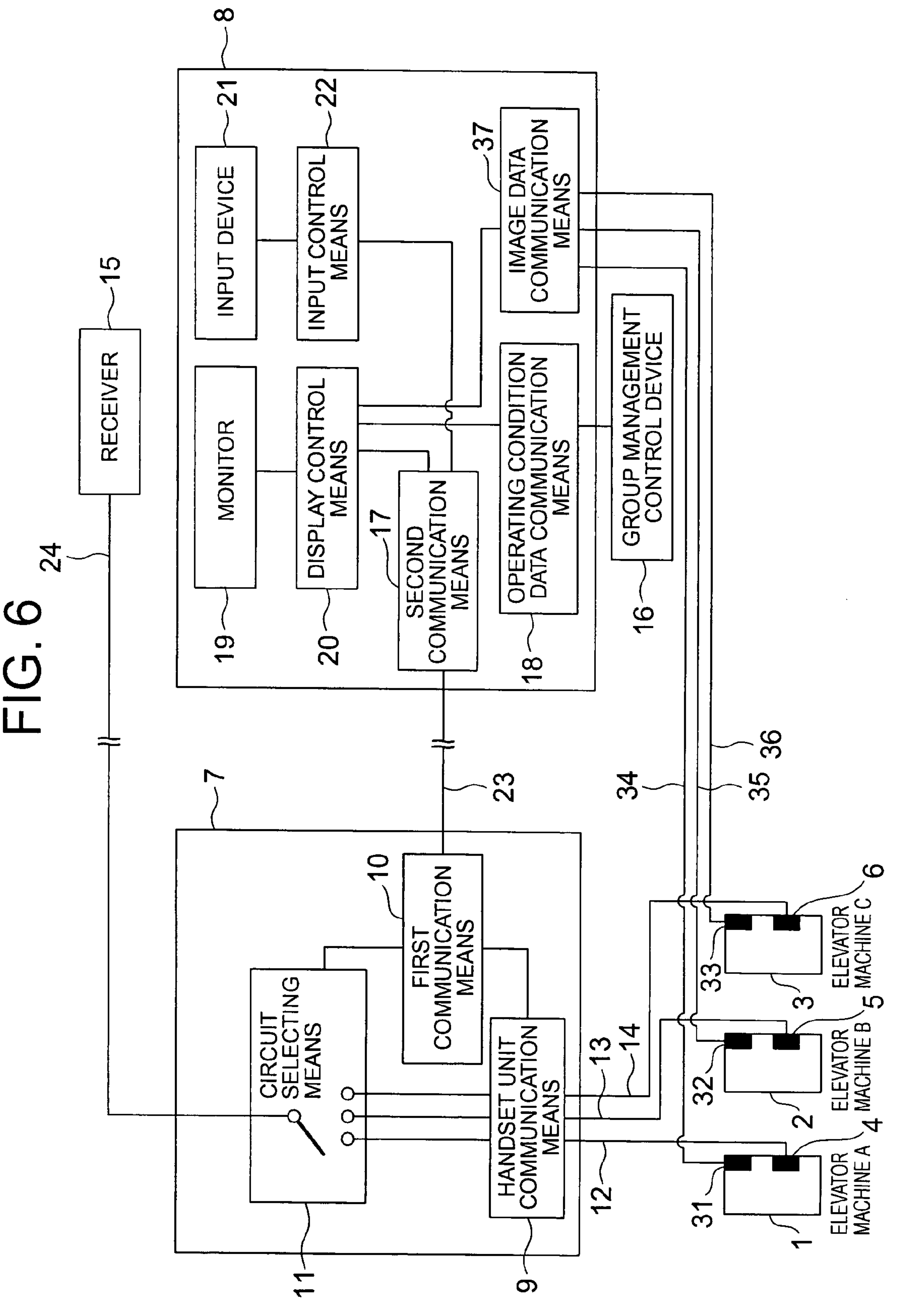
FIG. 6 A block diagram showing an elevator monitoring system according to Embodiment 2 of the present invention.

Reference will next be made to FIG. 6, which is a block diagram showing an elevator monitoring system according to Embodiment 2 of the present invention. Referring to the figure, monitoring cameras 31 to 33 for photographing the interiors of the cars 1 to 3 full-time are installed therein, respectively. The monitoring cameras 31 to 33 are connected to the operation monitoring device 8 via image cables 34 to 36, respectively.

The operation monitoring device 8 is provided with image data communication means 37 for receiving image data from the monitoring cameras 31 to 33. The monitoring cameras 31 to 33 periodically (e.g., at intervals of 1/30 milliseconds) write image data into buffers (not shown) provided in the image data communication means 37 respectively for the monitoring cameras 31 to 33.

The image data communication means 37 inputs the received image data to the display control means 20. That is, the image data communication means 37 periodically writes image data into a third buffer (not shown) of the display control means 20 (e.g., at intervals of 100 milliseconds). Based on the image data, the display control means 20 causes the monitor 19 to display images photographed by the monitoring cameras 31 to 33. Accordingly, the monitor 19 displays the images photographed by the monitoring cameras 31 to 33 as well as the operating conditions of the cars 1 to 3 and the communication states of the interphone handset units 4 to 6. Embodiment 2 of the present invention is identical to Embodiment 1 of the present invention in other constructional details.

Figure 7:
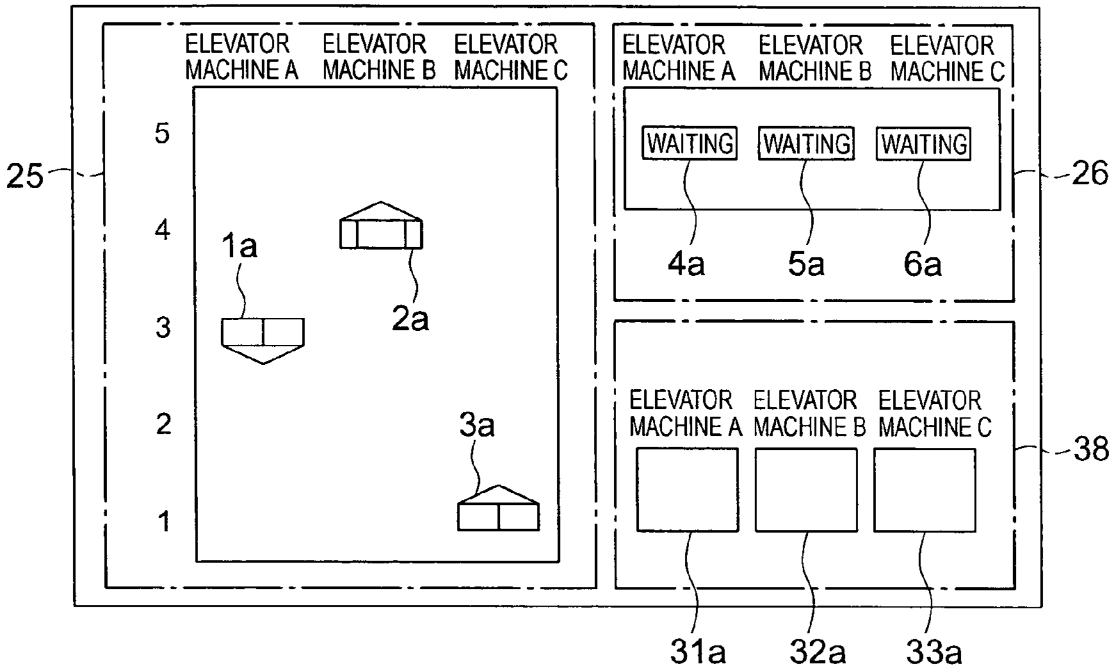
FIG. 7 A front view showing an example of contents displayed on a monitor of FIG. 6.

FIG. 7 is a front view showing an example of the contents displayed on the monitor 19 of FIG. 6. An image display region 38 based on the image data transmitted from the monitoring cameras 31 to 33 is provided on the right of the operating condition display region 25 and below the communication state display region 26. Car interior images 31*a*, 32*a*, and 33*a* corresponding respectively to the cars 1 to 3 and the machine code names are displayed in the image display region 38.

Figure 8:
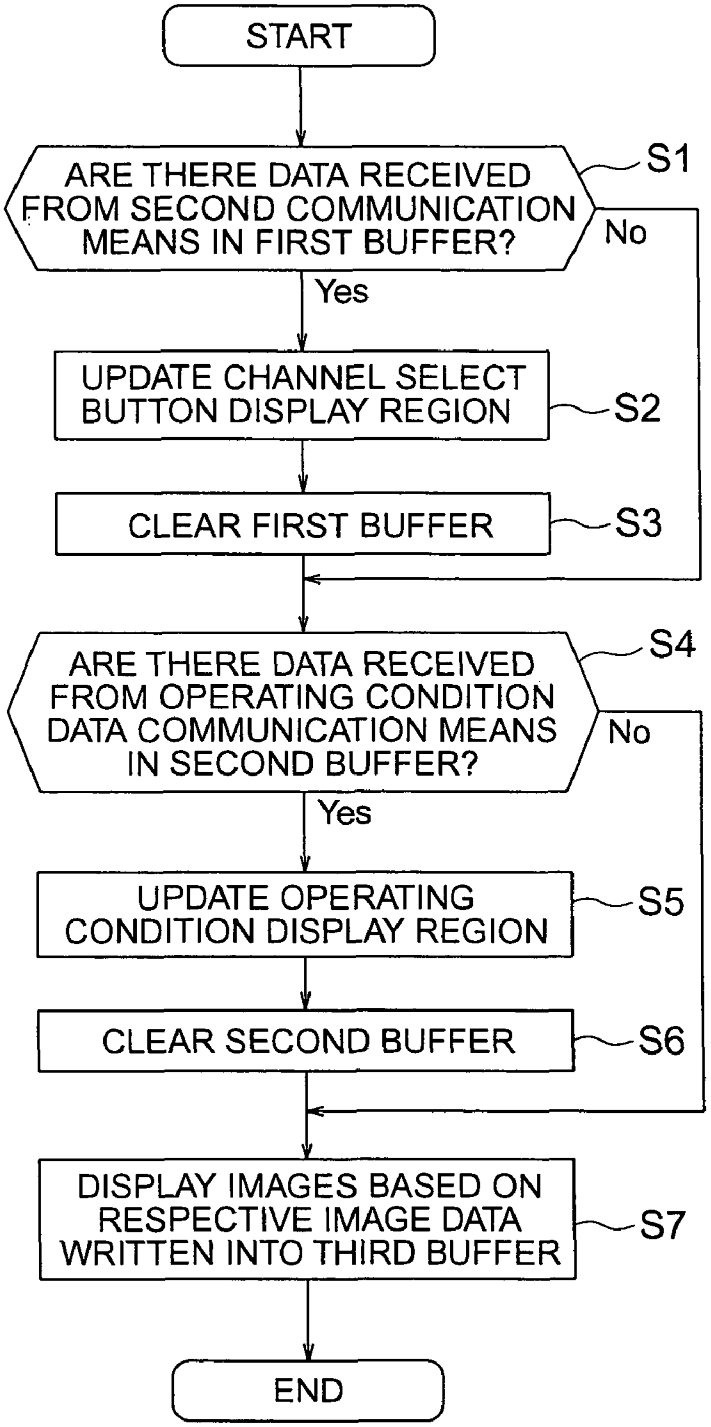
FIG. 8 A flowchart showing operations of a display control means of FIG. 6.

FIG. 8 is a flowchart showing the operations of the display control means 20 of FIG. 6. The display control means 20 periodically (e.g., at intervals of 200 milliseconds) performs the processing shown in FIG. 8 to update the contents displayed in the operating condition display region 25, the channel select button display region 26, and the image display region 38 shown in FIG. 7.

Among the operations of the display control means 20 according to Embodiment 2 of the present invention, the operations regarding the operating condition display region 25 and the channel select button display region 26 (Steps S1 to S6) are identical to those of Embodiment 1 of the present invention (FIG. 4). After having performed the operations regarding the channel select button display region 26, the display control means 20 causes the image display region 38 to display the images based on the image data written into the third buffer (Step S7).

In the elevator monitoring system according to Embodiment 2 of the present invention, as described above, the operation monitoring device 8 receives the image data transmitted from the monitoring cameras 31 to 33, and can cause the monitor 19 to display the images in the cars 1 to 3 based on the image data. Accordingly, the manager can talk with the passenger in a desired one of the cars 1 to 3 through interphone while monitoring the operating conditions of the elevators and the car interior images 31*a*, 32*a*, and 33*a* in front of the operation monitoring device 8.

In Embodiment 2 of the present invention, the car interior images 31*a*, 32*a*, and 33*a* are simply displayed in the image display region 38. However, the same functions as the channel select buttons 4*a* to 6*a* may be added to the portion for displaying the car interior images 31*a*, 32*a*, and 33*a*. In other words, the input control means 22 may start the operations shown in FIG. 5 also in response to the selection of one of the car interior images 31*a*, 32*a*, and 33*a* through the use of the input device 21. In this case, the input control means 22 confirms a display state of the channel select button corresponding to a selected one of the car interior images, but performs the same operations as in FIG. 5 in other respects.

Embodiment 3

Figure 9:
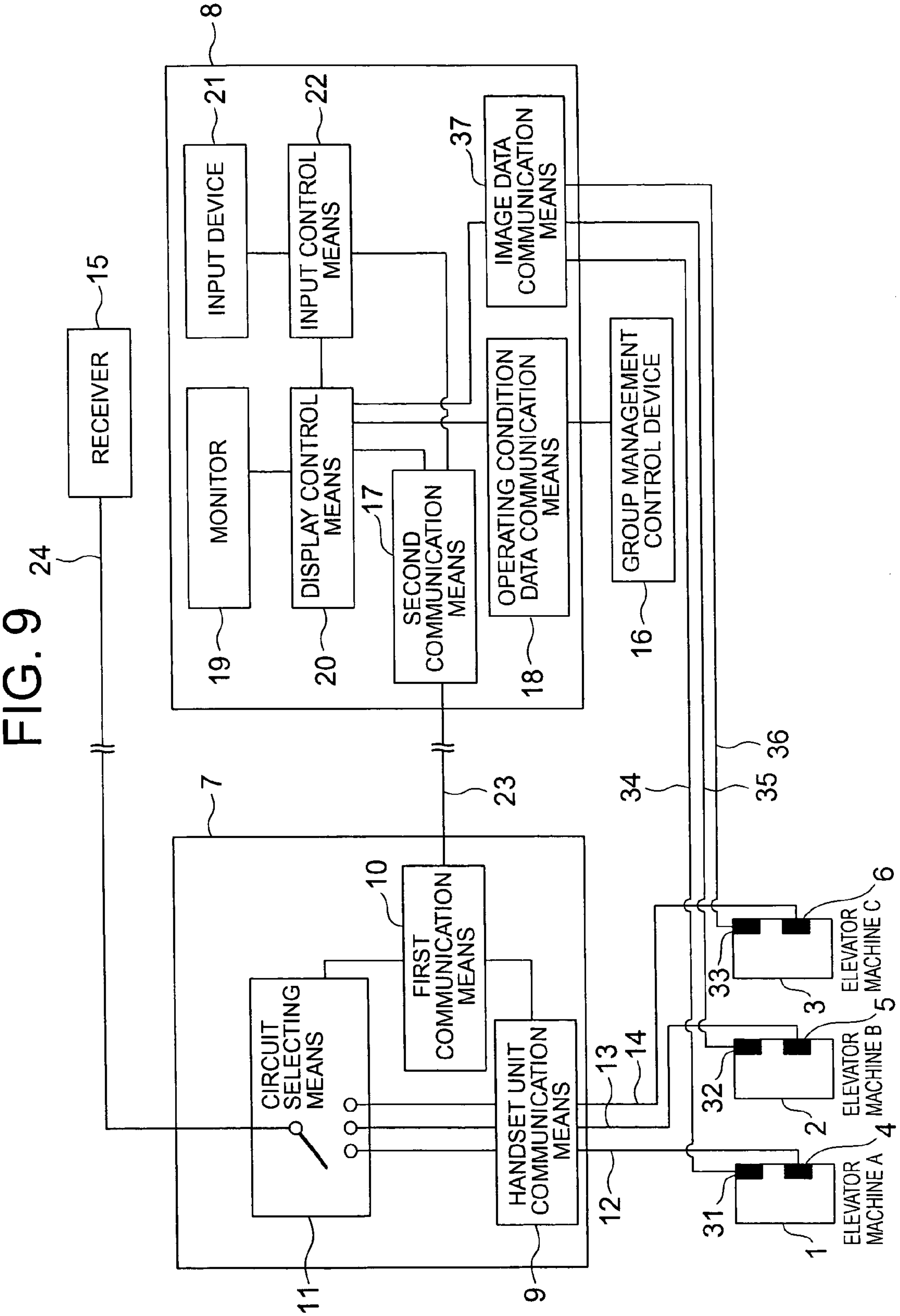
FIG. 9 A block diagram showing an elevator monitoring system according to Embodiment 3 of the present invention.

Reference will next be made to FIG. 9, which is a block diagram showing an elevator monitoring system according to Embodiment 3 of the present invention. Referring to the figure, the display control means 20 periodically makes a changeover in the images photographed by the monitoring cameras 31 to 33 based on image data, and causes the monitor 19 to display them sequentially. The display control means 20 also receives channel select information from the input control means 22, and causes the monitor 19 to selectively display that one of the images in the cars 1 to 3 which corresponds to that one of the interphone handset units 4 to 6 which has been selected by the input device 21. Embodiment 3 of the present invention is identical to Embodiment 2 of the present invention in other constructional details.

Figure 10:
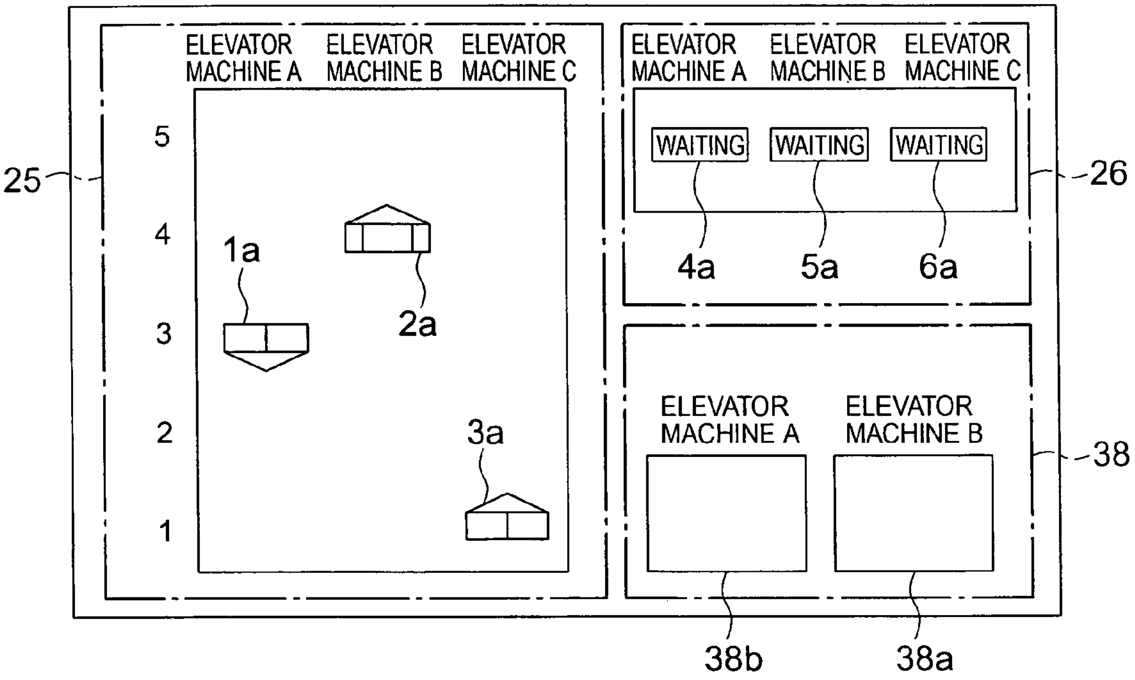
FIG. 10 A front view showing an example of contents displayed on a monitor of FIG. 9.

FIG. 10 is a front view showing an example of the contents displayed on the monitor 19 of FIG. 9. The image display region 38 includes a normal display region 38*a* for displaying the car interior images of all the cars 1 to 3 by periodically making a changeover therebetween, and a selective display region 38*b* for continuously displaying the car interior image of a selected one of the cars 1 to 3. The selected one of the cars means a car corresponding to the elevator machine with the communication state "TALKING" displayed in the channel select button 4*a*, 5*a*, or 6*a*, namely, a car in which there is a passenger talking with the manager through interphone.

A correspondence table showing how the monitoring cameras 31 to 33 correspond to the machine code names respectively as shown in FIG. 11 is preset in the display control means 20. Camera ID's are numbers uniquely allocated to all the monitoring cameras 31 to 33. The machine code names represent the order of image data input from the image data communication means 37 to the display control means 20. In the example of FIG. 10, the image data are input to the display control means 20 in the order of the elevator machine A, the elevator machine B, and the elevator machine C.

The display control means 20 operates according to a normal processing flow (FIG. 12) regarding the contents displayed in a region other than the selective display region 38*b*, and a selective display processing flow regarding the contents displayed in the selective display region 38*b*.

Figure 12:
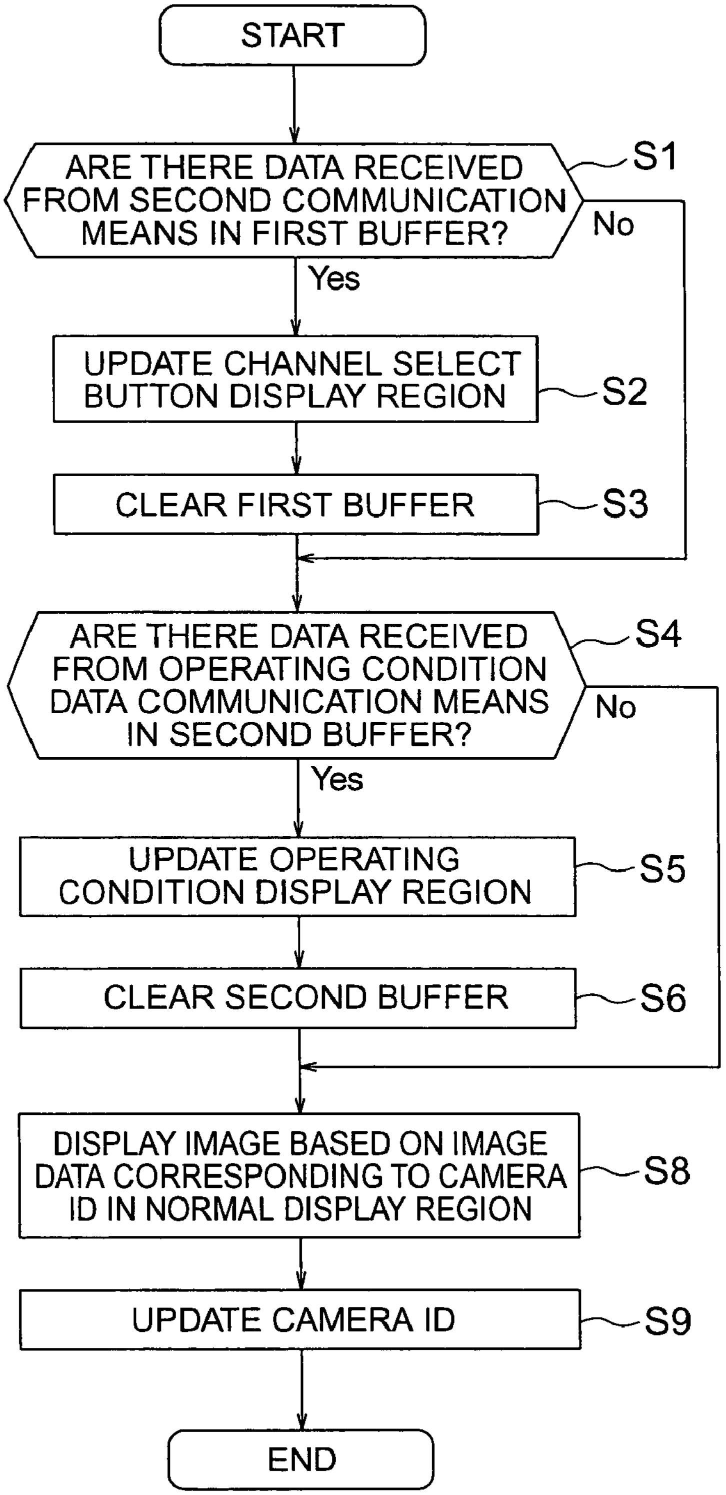
FIG. 12 A flowchart showing operations of the display control means of FIG. 9 according to a normal processing flow.

Reference will first be made first to FIG. 12, which is a flowchart showing the operations of the display control means 20 of FIG. 9 according to the normal processing flow. The display control means 20 periodically performs the operations shown in FIG. 12. Among the operations of the display control means 20 according to Embodiment 3 of the present invention, the operations regarding the operating condition display region 25 and the channel select button display region 26 (Steps S1 to S6) are identical to those of Embodiment 1 of the present invention (FIG. 4).

After having performed the operations regarding the channel select button display region 26, the display control means 20 displays an image based on the image data corresponding to a camera ID in the normal display region 38*a* (Step S8). That is, the display control means 20 acquires a machine code name corresponding to the camera ID using the correspondence table of FIG. 11, and displays the acquired machine code name and a car interior image based on the image data having the machine code name in the normal display region 38*a*.

After that, the display control means 20 updates the camera ID (Step S9). That is, according to the correspondence table of FIG. 11, the display control means 20 updates the camera ID to "2", "3", and "1" if it is "1", "2", and "3" before being updated. Accordingly, when the operations of FIG. 13 are performed at intervals of, for example, 200 milliseconds, the image displayed in the normal display region 38*a* is also changed over at intervals of 200 milliseconds.

Figure 13:
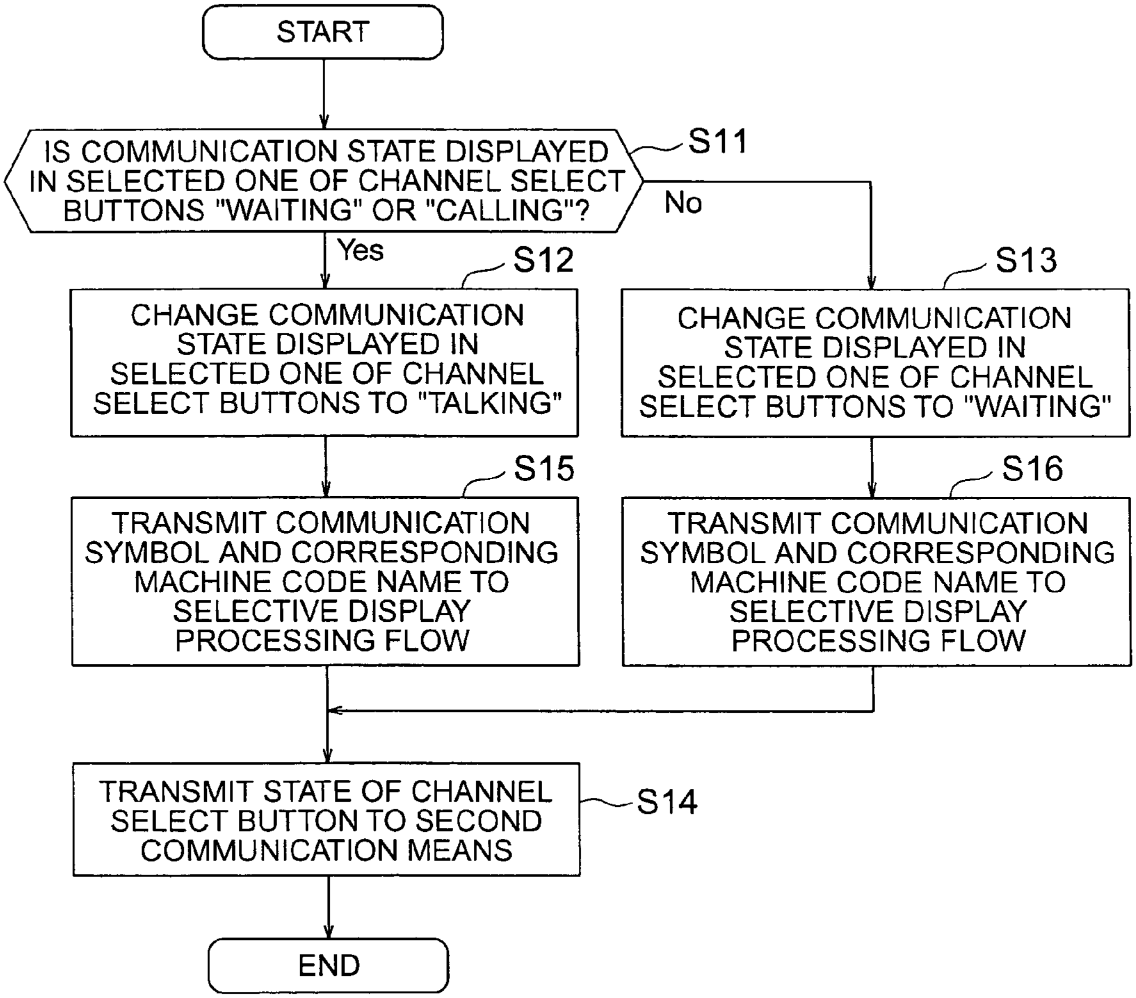
FIG. 13 A flowchart showing the operations of an input control means of FIG. 9.

Reference will next be made next to FIG. 13, which is a flowchart showing the operations of the input control means 22 of FIG. 9. The processing shown in this flowchart is started in response to the selection of one of the channel select buttons 4*a* to 6*a* through the use of the input device 21. The operations regarding a changeover in the display of the channel select buttons 4*a* to 6*a* and the transmission of channel select information (Steps S11 to S14) are the same as those of Embodiment 1 of the present invention (FIG. 5).

When the selected one of the channel select buttons 4*a* to 6*a* is displayed as "TALKING" (Step S12), the input control means 22 transmits the communication symbol "1" and the corresponding machine code name to a selective display processing flow of the display control means 20 using the conversion table of FIG. 2 (Step S15). When the selected one of the channel select buttons 4*a* to 6*a* is displayed as "WAITING", the input control means 22 transmits the communication symbol "3" and the corresponding machine code name to the selective display processing flow of the display control means 20.

Next, the selective display processing flow of the display control means 20 will be described. The selective display processing flow is periodically carried out. When the display control means 20 receives the communication symbol "1" from the input control means 22, it acquires image data corresponding to the corresponding machine code name from the third buffer, and displays an image based on the acquired image data and the corresponding machine code name in the selective display region 38*b*. When the display control means 20 receives the communication symbol "3" from the input control means 22, it displays a blue-back image in the selective display region 38*b*. In other words, when no conversation occurs through interphone, the display control means 20 displays no car interior image in the selective display region 38*b*.

In the elevator monitoring system constructed as described above, the images in the plurality of the cars 1 to 3 are sequentially changed over and displayed in the normal display region 38*a*. Therefore, the interiors of the cars 1 to 3 can be monitored as images in a larger size even when a large number of monitoring cameras, namely, the monitoring cameras 31 to 33 are connected. The car interior image of a selected one of the cars is displayed in the selective display region 38*b*. Therefore, the manager is allowed to talk with a passenger through interphone while monitoring a car in which the passenger is talking through interphone, as an image in a larger size as well.

Although the single normal display region 38*a* is provided in Embodiment 3 of the present invention, it is also appropriate to provide a plurality of normal display regions or divide the inside of the normal display region into a plurality of sections. For example, in the case where a large number of monitoring cameras are connected, it is also appropriate to classify the monitoring cameras into a plurality of blocks, make a changeover in images photographed by the monitoring cameras in each of the blocks, and sequentially display the images in a corresponding one of the normal display regions.

It is also appropriate to construct at least part of the screen of the monitor 19 according to Embodiments 1 to 3 of the present invention as, for example, a touch panel, so channel select information can be input by touching the screen.

Furthermore, the present invention is also applicable to a double-deck elevator or a one-shaft multi-car type elevator.

Embodiment 4

Figure 14:
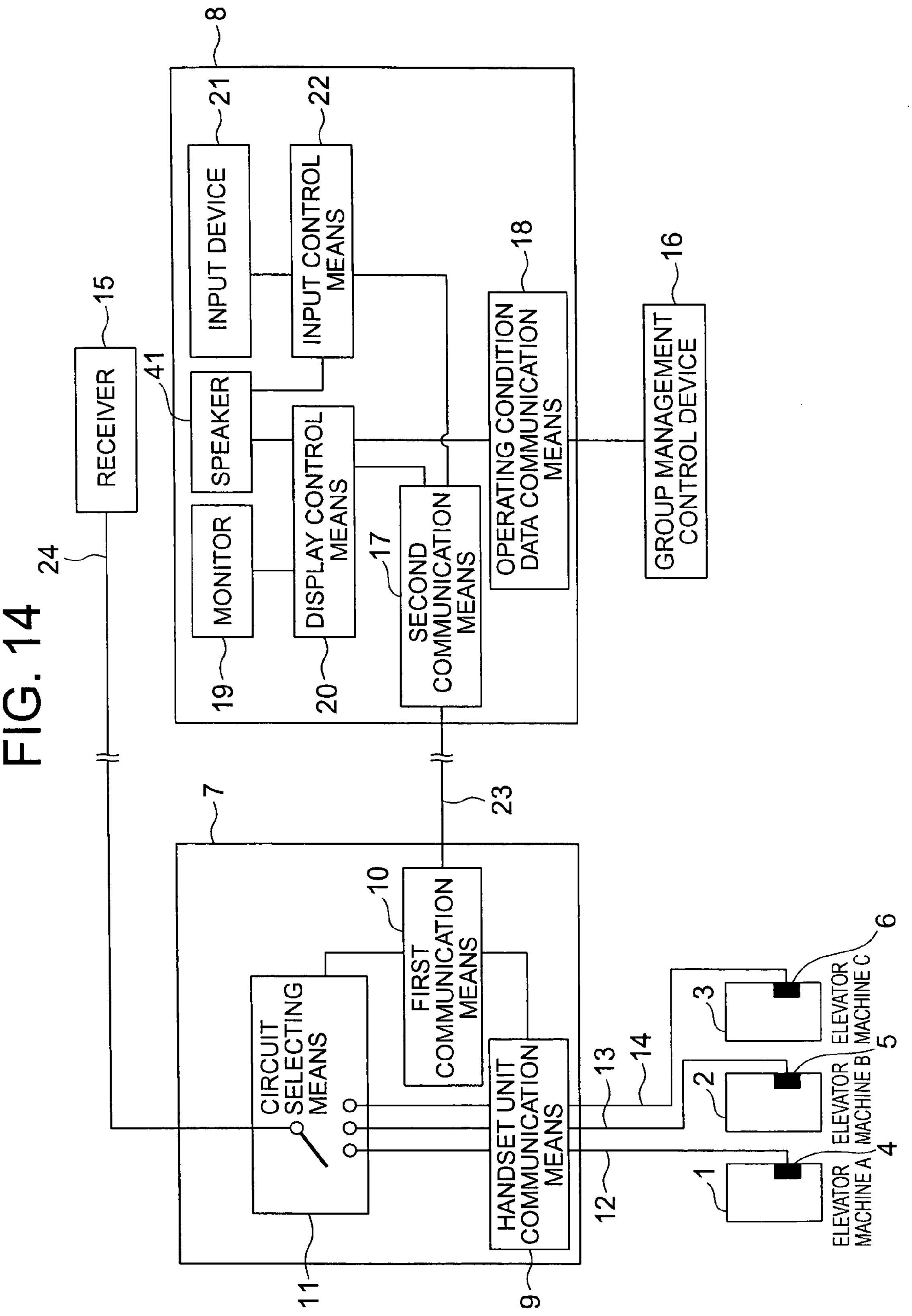
FIG. 14 A block diagram showing an elevator monitoring system according to Embodiment 4 of the present invention.

Reference will next be made next to FIG. 14, which is a block diagram showing an elevator monitoring system according to Embodiment 4 of the present invention. Referring to the figure, the operation monitoring device 8 is provided with a speaker (a monitoring device-side speaker) 41. The display control means 20 inputs a bell sound ringing signal and a bell sound non-ringing signal to the speaker 41. The input control means 22 inputs a bell sound ringing signal and a bell sound non-ringing signal to the speaker 41. The speaker 41 issues a bell sound as a calling upon receiving the bell sound ringing signal, and stops the ringing of the bell sound upon receiving the bell sound non-ringing signal.

Figure 15:
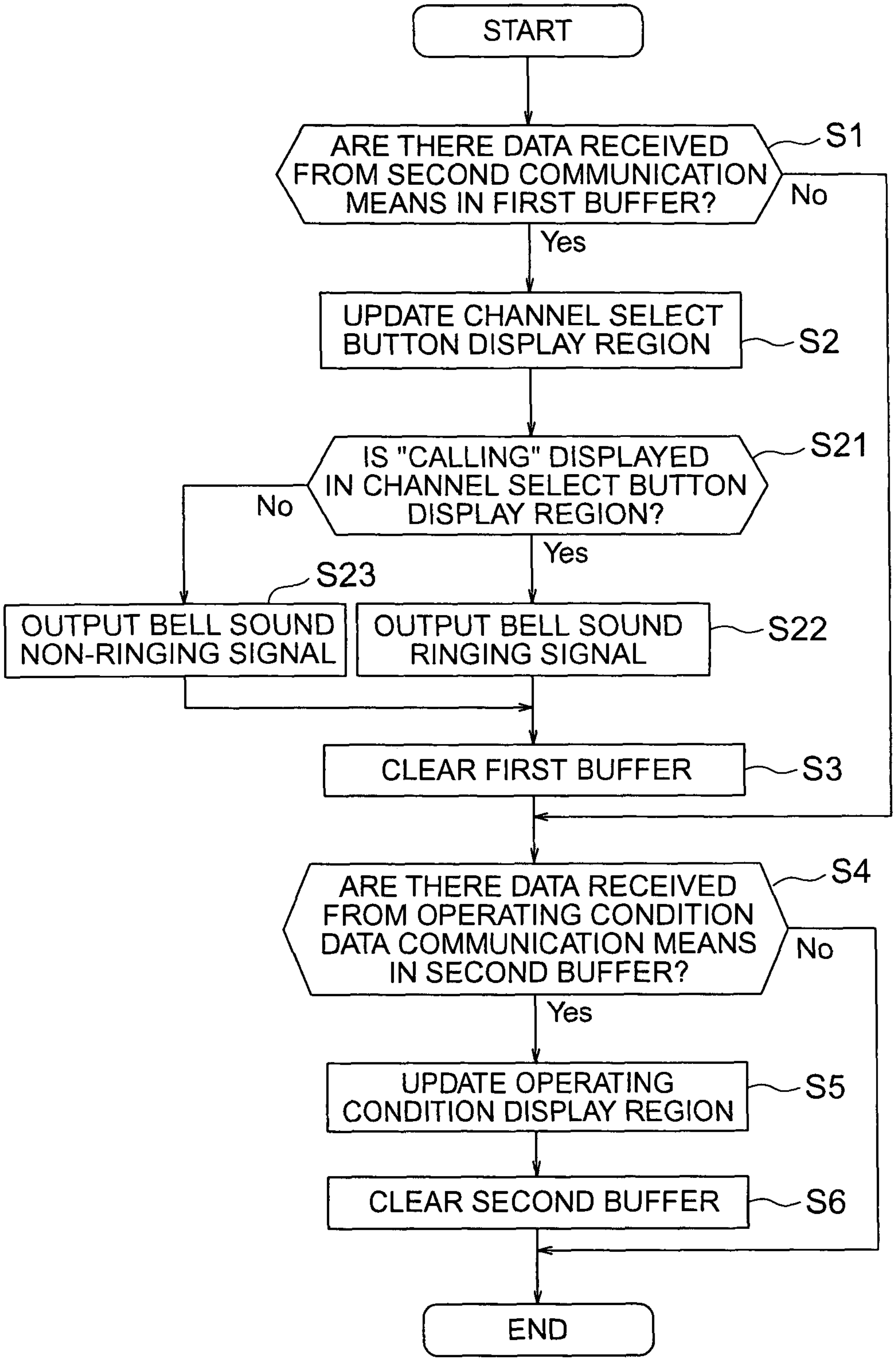
FIG. 15 A flowchart showing operations of a display control means of FIG. 14.

FIG. 15 is a flowchart showing the operations of the display control means 20 of FIG. 14. When data have been written into the first buffer, the display control means 20 updates the contents displayed in the channel select button display region 26 (Step S2), and then confirms whether or not the communication state "CALLING" is displayed in the updated channel select button display region 26 (Step S21). When the communication state "CALLING" is displayed in the updated channel select button display region 26, the display control means 20 outputs a bell sound ringing signal to the speaker 41 (Step S22). When the communication state "CALLING" is not displayed in the channel select button display region 26, the display control means 20 outputs a bell sound non-ringing signal to the speaker 41 (Step S23).

For example, when the communication state information "233" has been written into the first buffer, the display control means 20 recognizes that the communication symbol of the elevator machine A is "2", and that the communication symbols of the elevator machines B and C are "3", determines based on the conversion table of FIG. 2 that the communication state in the elevator machine A is "CALLING", and outputs a bell sound ringing signal.

Figure 16:
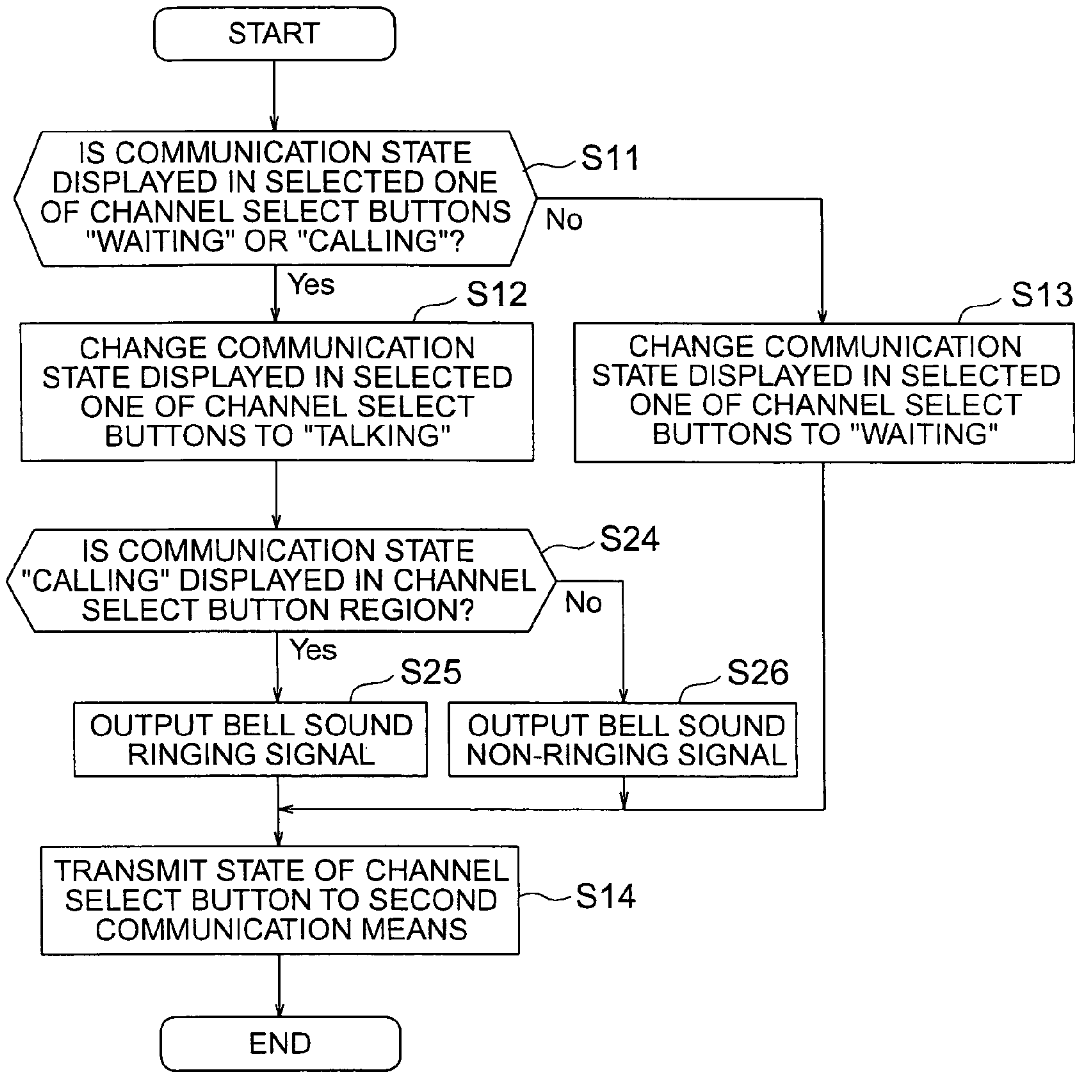
FIG. 16 A flowchart showing operations of an input control means of FIG. 14.

FIG. 16 is a flowchart showing the operations of the input control means 22 of FIG. 14. The input control means 22 changes the communication states displayed in the channel select buttons 4*a* to 6*a* to "TALKING" (Step S12), and then confirms whether or not the communication state "CALLING" is displayed in the channel select button display region 26 (Step S24). When the communication state "CALLING" is displayed in the channel select button display region 26, the input control means 22 outputs a bell sound ringing signal to the speaker 41 (Step S25). When the communication state "CALLING" is not displayed in the channel select button display region 26, the input control means 22 outputs a bell sound non-ringing signal to the speaker 41 (Step S26).

Embodiment 4 of the present invention is identical to Embodiment 1 of the present invention in other constructional details.

In the elevator monitoring system according to Embodiment 4 of the present invention, as described above, a bell sound is issued from the speaker 41 provided in the operation monitoring device 8 based on the information on the communication states of the interphone handset units 4 to 6. Therefore, when there is a message from a passenger in any one of the cars 1 to 3, a bell sound is issued from the speaker 41 so that the manager can be informed swiftly.

Embodiment 5

Figure 17:
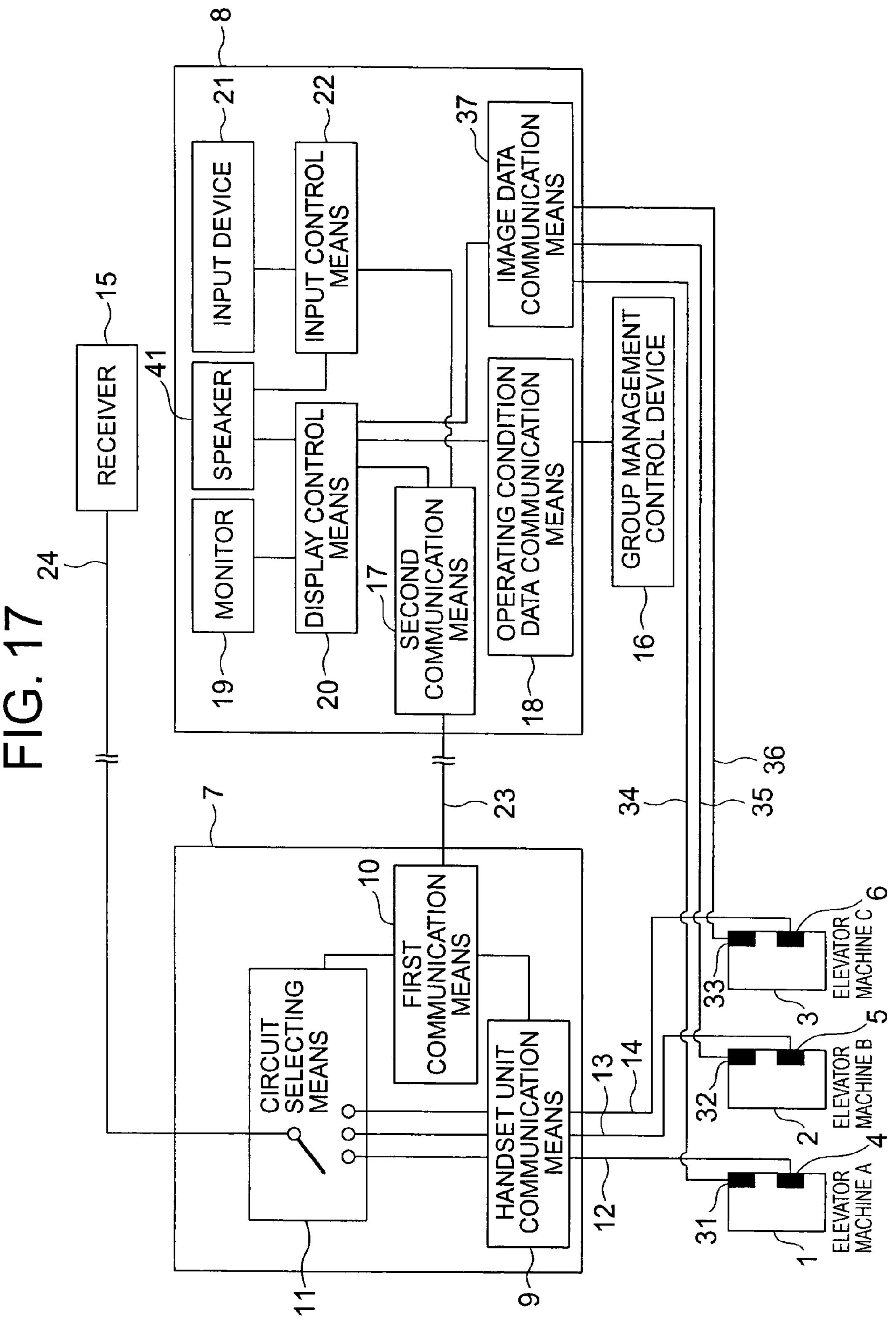
FIG. 17 A block diagram showing an elevator monitoring system according to Embodiment 5 of the present invention.

Reference will next be made to FIG. 17, which is a block diagram showing an elevator monitoring system according to Embodiment 5 of the present invention. In Embodiment 5 of the present invention, the function regarding the speaker 41 according to Embodiment 4 of the present invention is added to the elevator monitoring system according to Embodiment 2 of the present invention. With this construction as well, when there is a message from a passenger in any one of the cars 1 to 3, a bell sound is issued from the speaker 41 so that the manager can be informed swiftly.

Embodiment 6

Figure 18:
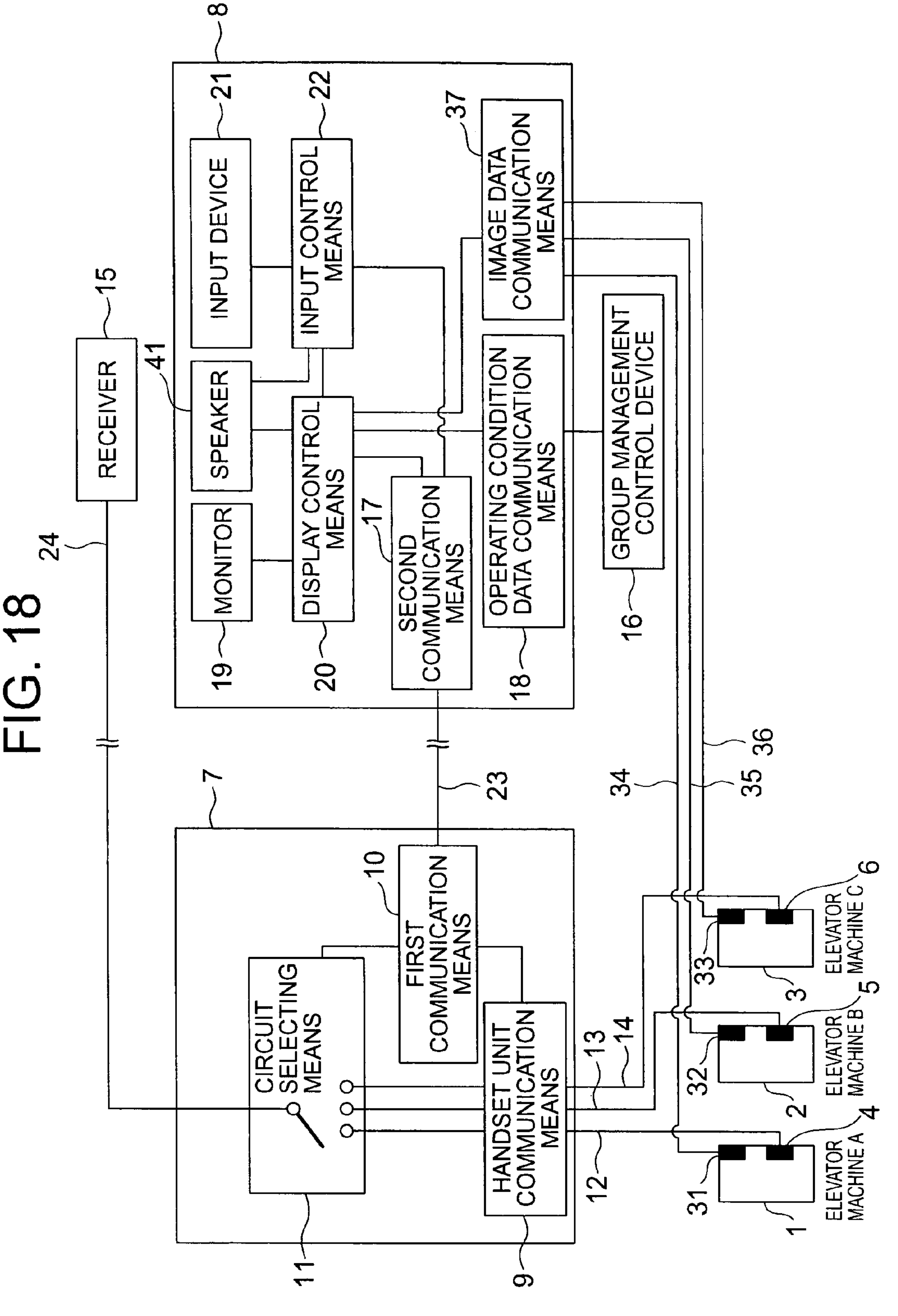
FIG. 18 A block diagram showing an elevator monitoring system according to Embodiment 6 of the present invention.

Reference will next be made to FIG. 18, which is a block diagram showing an elevator monitoring system according to Embodiment 6 of the present invention. In Embodiment 6 of the present invention, the function regarding the speaker 41 according to Embodiment 4 of the present invention is added to the elevator monitoring system according to Embodiment 3 of the present invention. With this construction as well, when there is a message from a passenger in any one of the cars 1 to 3, a bell sound is issued from the speaker 41 so that the manager can be informed swiftly.

In Embodiments 4 to 6 of the present invention, the calling sound should not be limited to a bell sound and may be, for example, a prerecorded announcement.

The speaker should not be necessarily provided in a main unit of the operation monitoring device, and may be disposed at a position remote from the main unit of the operation monitoring device.

Embodiment 7

Figure 19:
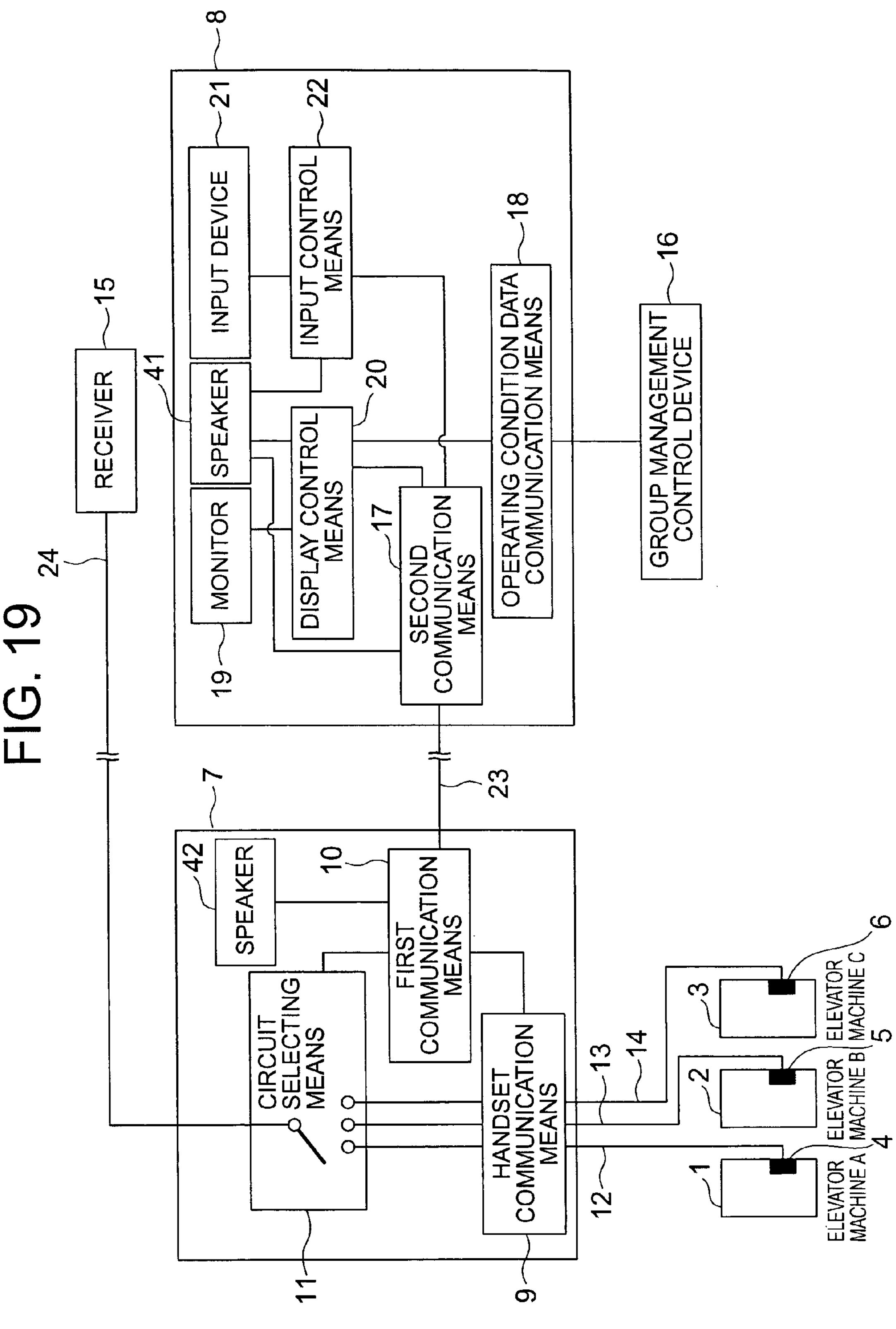
FIG. 19 A block diagram showing an elevator monitoring system according to Embodiment 7 of the present invention.

Reference will next be made to FIG. 19, which is a block diagram showing an elevator monitoring system according to Embodiment 7 of the present invention. Referring to the figure, the interphone base unit 7 is provided with a speaker (a base unit-side speaker) 42.

When the communication symbol meaning “CALLING” is included in the communication state information transmitted from the first communication means 10 to the second communication means 17, the first communication means 10 outputs a bell sound ringing signal to the speaker 42 in accordance with the validity of communication with the second communication means 17. When the communication symbol meaning “CALLING” is not included in the channel select information received from the second communication means 17, the first communication means 10 outputs a bell sound non-ringing signal to the speaker 42 in accordance with the validity of communication with the second communication means 17.

The first communication means 10 and the second communication means 17 each transmit/receive a confirmation signal for confirming the validity of mutual communication, and select the speaker 41 or 42 to ring a bell sound (calling sound) in accordance with the receiving condition of the confirmation signal. A unique communication symbol is allocated to the confirmation signal so as to be prevented from being confused with the communication state information or the channel select information.

For example, a 0xFF signal is output from the first communication means 10 as a confirmation signal at intervals of T seconds, and a 0xFE signal is output from the second communication means 17 as a confirmation signal at intervals of T seconds. Therefore, when normal (valid) communication is carried out, the first communication means 10 receives a 0xFE signal at intervals of T seconds, and the second communication means 17 receives a 0xFF signal at intervals of T seconds, on the condition that the dispersion of time required for communication is negligible.

Given herein that the first communication means 10 receives a 0xFE signal at intervals of T1 seconds, it is possible to determine that an abnormality has occurred in the communication between the first communication means 10 and the second communication means 17 when T1 is much larger than T. In Embodiment 7 of the present invention, a threshold TH for determining whether or not an abnormality has occurred in communication is set equal to 3×T.

Based on the above premise, when T1>TH, the first communication means 10 determines that an abnormality has occurred in communication, and transmits an “ON” signal to the speaker 42 as a speaker control signal. On the other hand, when T1≦TH, the first communication means 10 determines that normal communication is carried out, and transmits an “OFF” signal to the speaker 42 as a speaker control signal.

Given that the second communication means 17 receives a 0xFE signal at intervals of T2 seconds, when T2>TH, the second communication means 17 determines that an abnormality has occurred in communication, and transmits an “OFF” signal to the speaker 41 as a speaker control signal. On the other hand, when T2≦TH, the second communication means 17 determines that normal communication is carried out, and transmits an “ON” signal to the speaker 41 as a speaker control signal.

When the latest received speaker control signal is an “OFF” signal (the state of communication is normal), the speaker 42 of the interphone base unit 7 constantly holds the ringing of a bell sound stopped irrespective of a bell sound ringing signal and a bell sound non-ringing signal. When the latest received speaker control signal is an “ON” signal (the state of communication is abnormal), the speaker 42 determines the ringing or non-ringing of a bell sound in accordance with a bell sound ringing signal and a bell sound non-ringing signal as in the case of Embodiment 1 of the present invention.

When the latest received speaker control signal is an “OFF” signal (the state of communication is abnormal), the speaker 41 of the operation monitoring device 8 constantly holds the ringing of a bell sound stopped irrespective of a bell sound ringing signal and a bell sound non-ringing signal. When the latest received speaker control signal is an “ON” signal (the state of communication is normal), the speaker 41 determines the ringing or non-ringing of a bell sound in accordance with a bell sound ringing signal and a bell sound non-ringing signal as in the case of Embodiment 1 of the present invention.

In the elevator monitoring system according to Embodiment 7 of the present invention, as described above, the first communication means 10 and the second communication means 17 exchange signals for confirming the validity of communication, and select the speaker 41 or 42 to ring a bell sound in accordance with the validity of communication. Therefore, when the state of communication is normal, only the speaker 41 of the operation monitoring device 8, which is assumed to be located close to the manager, can be operated to ring a bell sound, so the noisiness of the bell sound can be reduced. Even when an abnormality has occurred in the state of communication, the speaker 42 of the interphone base unit 7 is operated to ring a bell sound, so the manager or the like can be informed of a call from the interphone handset unit 4, 5, or 6.

Embodiment 8

Figure 20:
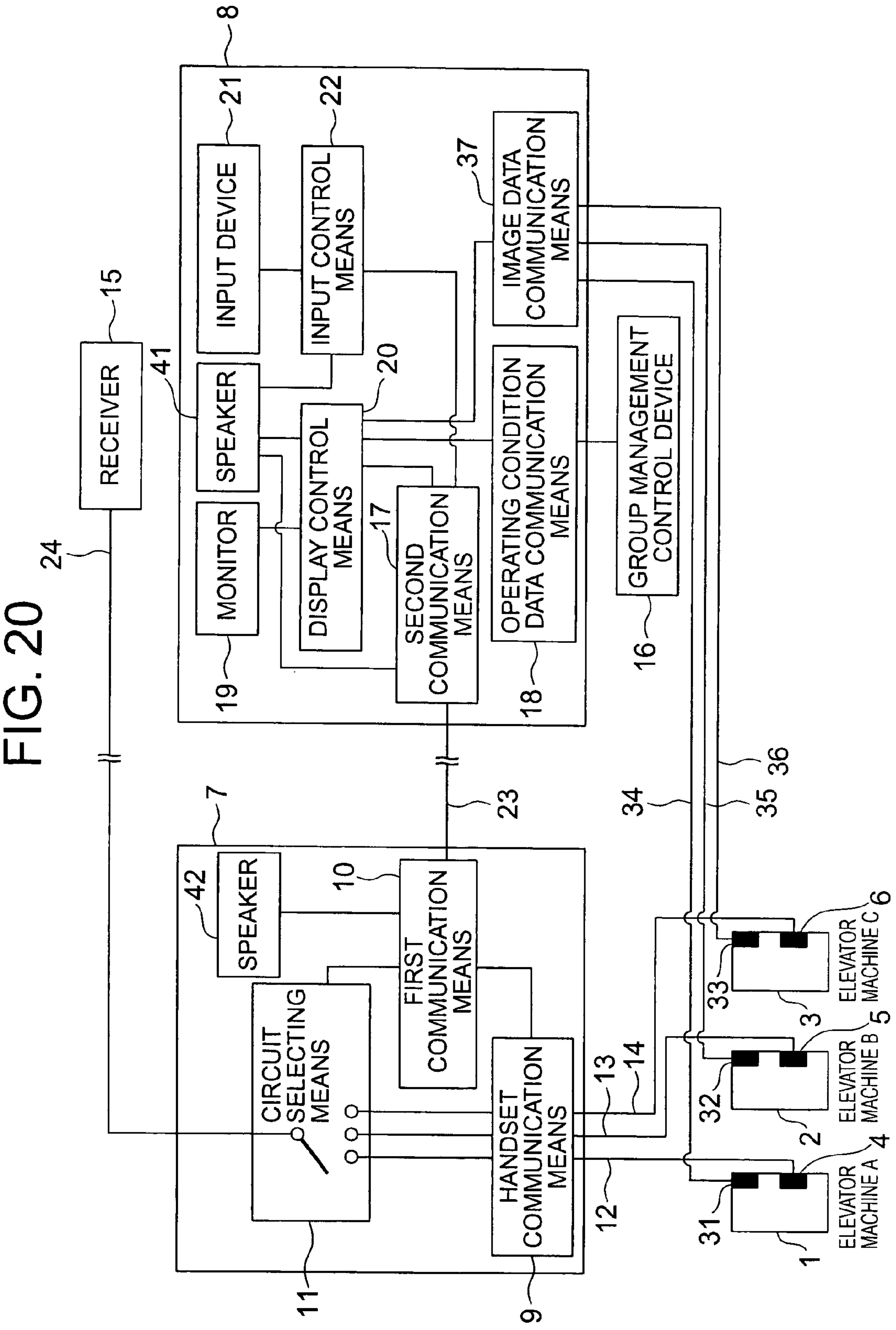
FIG. 20 A block diagram showing an elevator monitoring system according to Embodiment 8 of the present invention.

Reference will next be made to FIG. 20, which is a block diagram showing an elevator monitoring system according to Embodiment 8 of the present invention. In Embodiment 8 of the present invention, the function regarding the confirmation of the validity of communication according to Embodiment 7 of the present invention is added to the elevator monitoring system according to Embodiment 5 of the present invention. With this construction as well, the speaker 41 or 42 can be selected to ring a bell sound in accordance with the validity of communication.

Embodiment 9

Figure 21:
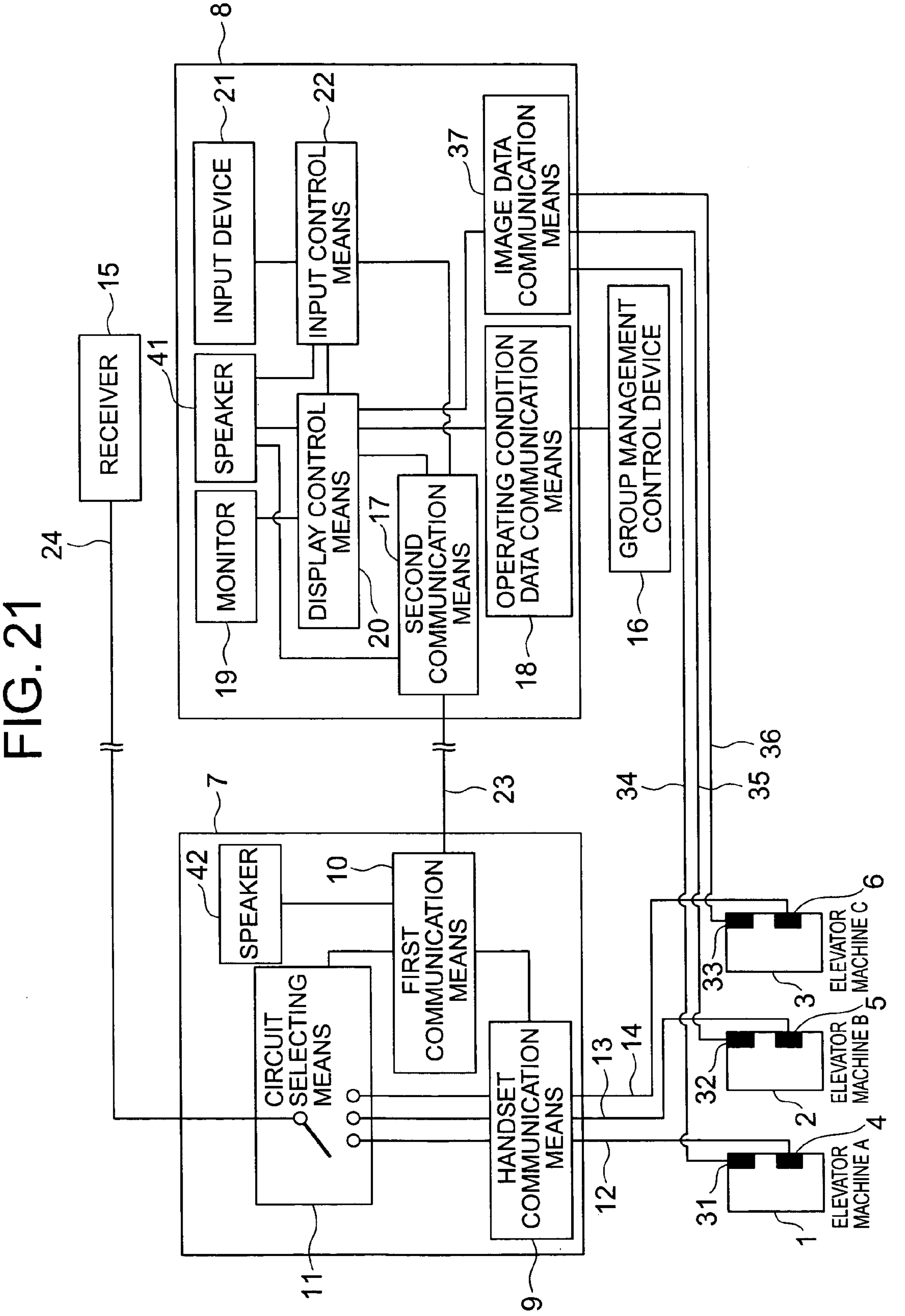
FIG. 21 A block diagram showing an elevator monitoring system according to Embodiment 9 of the present invention.

Reference will next be made to FIG. 21, which is a block diagram showing an elevator monitoring system according to Embodiment 9 of the present invention. In Embodiment 9 of the present invention, the function regarding the confirmation of the validity of communication according to Embodiment 7 of the present invention is added to the elevator monitoring system according to Embodiment 6 of the present invention. With this construction as well, the speaker 41 or 42 can be selected to ring a bell sound in accordance with the validity of communication.

The invention claimed is:

1. An elevator monitoring system, comprising:

an interphone base unit that communicates with a plurality of interphone handset units, each interphone handset unit included in an elevator from a plurality of elevators; and an operation monitoring device that receives operating condition data from a group management control device to control operations of the plurality of elevators, and causes a monitor to display operating conditions for each of the elevators, wherein the interphone base unit and the operation monitoring device communicate with each other, the operation monitoring device causes the monitor to simultaneously display, with the operating conditions for each of the elevators, communication states for each of the interphone handset units based on information on the communication states of the interphone handset units received from the interphone base unit, and display channel select information to select, by an input operation, one of the interphone handset units to communicate with, and the interphone base unit transmits the information on the communication states to the operation monitoring device, and switches between states of connection with the interphone handset units based on selected channel select information received from the operation monitoring device.

2. The elevator monitoring system according to claim 1, wherein the interphone base unit includes a handset unit communication means for monitoring states of communication with the interphone handset units, and a first communication means for transmitting the information on the communication states to the operation monitoring device, and the operation monitoring device includes second communication means for receiving the information on the communication states from the first communication means and transmitting the channel select information to the first communication means.

3. The elevator monitoring system according to claim 1, wherein the monitor displays the communication states of the interphone handset units as channel select buttons respectively, and the operation monitoring device selects one of the channel select buttons within a display screen of the monitor to allow the channel select information to be input thereto.

4. The elevator monitoring system according to claim 1, wherein the operation monitoring device receives image data transmitted from a plurality of monitoring cameras for photographing interiors of the plurality of elevators, and causes the monitor to simultaneously display images of the interior for each elevator from the plurality of elevators based on the image data.

5. The elevator monitoring system according to claim 1, wherein the monitor is provided with a normal display region and a selective display region, and the operation monitoring device displays an interior image of one of the elevators which corresponds to the selected channel select information in the selective display region, and sequentially displays the images in the other elevators in the normal display region.

6. The elevator monitoring system according to claim 4, wherein the operation monitoring device selects one of the images of the elevators within the display screen of the monitor to allow selection of the channel select information for that one of the interphone handset units which corresponds to the selected one of the elevators.

7. The elevator monitoring system according to claim 1, wherein the operation monitoring device generates a calling sound based on the information on the communication states of the interphone handset units.

8. The elevator monitoring system according to claim 7, wherein the interphone base unit generates a calling sound based on the information on the communication states and the channel select information, and the interphone base unit and the operation monitoring device transmit/receive confirmation signals for confirming validity of mutual communication, and select whether the interphone base unit or the operation monitoring device should generate a calling sound, in accordance with receiving conditions of the confirmation signals.

* * * * *